US011175494B2

(12) United States Patent
Otoguro et al.

(10) Patent No.: US 11,175,494 B2
(45) Date of Patent: Nov. 16, 2021

(54) OPTICAL SCANNING APPARATUS AND IMAGE FORMING APPARATUS

(71) Applicant: CANON KABUSHIKI KAISHA, Tokyo (JP)

(72) Inventors: Yasuaki Otoguro, Abiko (JP); Toshiki Momoka, Tokyo (JP); Yuichiro Imai, Tokyo (JP); Yuta Okada, Moriya (JP); Yoshitaka Otsubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/793,315

(22) Filed: Feb. 18, 2020

(65) Prior Publication Data

US 2020/0271923 A1 Aug. 27, 2020

(30) Foreign Application Priority Data

Feb. 27, 2019 (JP) .............................. JP2019-034246

(51) Int. Cl.
*G02B 26/12* (2006.01)
*G03G 15/04* (2006.01)
*G03G 21/20* (2006.01)

(52) U.S. Cl.
CPC ..... *G02B 26/121* (2013.01); *G03G 15/04036* (2013.01); *G03G 21/20* (2013.01)

(58) Field of Classification Search
CPC ..... G03G 15/04036; G03G 2215/0402; G03G 21/20; G03G 21/206; G02B 26/10; G02B 26/121
See application file for complete search history.

(56) References Cited

U.S. PATENT DOCUMENTS

| 7,522,326 | B1 | 4/2009 | Otoguro ........................ 347/256 |
| 7,684,099 | B2 | 3/2010 | Otoguro ...................... 359/216.1 |
| 8,810,622 | B2 | 8/2014 | Mamiya et al. .............. 347/242 |
| 8,917,305 | B2 | 12/2014 | Nakahata et al. ............ 347/244 |
| 8,947,478 | B2 | 2/2015 | Ishidate et al. .............. 347/137 |
| 9,086,645 | B2 | 7/2015 | Otoguro et al. ... G03G 15/0435 |
| 9,195,063 | B2 | 11/2015 | Ishidate et al. .. G03G 15/04072 |

(Continued)

FOREIGN PATENT DOCUMENTS

JP 2017-191258 10/2017

OTHER PUBLICATIONS

U.S. Appl. No. 16/697,673, filed Nov. 27, 2019.
U.S. Appl. No. 16/698,107, filed Nov. 27, 2019.

*Primary Examiner* — Sophia S Chen
(74) *Attorney, Agent, or Firm* — Venable LLP

(57) ABSTRACT

An optical scanning apparatus includes a light source, a light deflecting unit, an optical member, a casing, a cover member, and a detecting unit. The cover member is provided with a first opening permitting passage of a light beam emitted from the light source, a second opening permitting passage of the light beam deflected by the deflecting unit, and third and fourth openings which are provided in positions on a side opposite from the first and second openings with respect to the deflecting unit. Through the third opening, an outflow of the air from the cover member by rotation of said deflecting unit is relatively high. Through the fourth opening, an inflow of the air into the cover member by rotation of said deflecting unit is relatively high. The detecting unit is provided at a position where the air flow blowing through the third opening hits the detecting unit.

6 Claims, 7 Drawing Sheets

(56) References Cited

U.S. PATENT DOCUMENTS

| | | | |
|---|---|---|---|
| 9,316,992 B2 | 4/2016 | Ishidate et al. | G03G 15/80 |
| 9,400,444 B2 | 7/2016 | Sato et al. | G03G 15/043 |
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | C03G 15/0435 |
| 9,906,663 B2 | 2/2018 | Otsubo | G03G 15/04045 |
| 9,927,732 B2 | 3/2018 | Otsubo | G03G 15/04045 |
| 10,061,119 B2 | 8/2018 | Ogura et al. | G02B 7/181 |
| 10,185,119 B2 | 1/2019 | Ishidate et al. | G02B 7/1821 |
| 10,274,860 B2 | 4/2019 | Otoguro et al. | G03G 15/04072 |
| 10,303,080 B2 | 5/2019 | Ishidate et al. | B41J 2/47 |
| 10,303,081 B2 | 5/2019 | Ishidate et al. | G03G 15/04036 |
| 10,324,396 B2 | 6/2019 | Imai et al. | G02B 26/12 |
| 10,389,897 B2 | 8/2019 | Imai | G02B 26/127 |
| 10,451,870 B2 | 10/2019 | Okada et al. | G02B 26/121 |
| 10,473,922 B2 | 11/2019 | Aruga et al. | G02B 26/121 |
| 10,484,566 B2 | 11/2019 | Namba et al. | G02B 26/123 |
| 10,498,920 B2 | 12/2019 | Okada et al. | H04N 1/00649 |
| 10,520,851 B2 | 12/2019 | Aruga et al. | G02B 26/12 |
| 10,558,140 B2 | 2/2020 | Okada et al. | G02B 7/182 |
| 2017/0064108 A1* | 3/2017 | Mamiya et al. | H04N 1/00525 |
| 2017/0299975 A1* | 10/2017 | Mizutani | G02B 26/121 |
| 2017/0299976 A1 | 10/2017 | Mizutani et al. | G03G 15/04036 |
| 2018/0231768 A1 | 8/2018 | Nakahata et al. | G02B 26/124 |
| 2020/0073277 A1 | 3/2020 | Ogura et al. | G03G 15/0435 |

* cited by examiner

OPTICAL SCANNING APPARATUS AND IMAGE FORMING APPARATUS

FIELD OF THE INVENTION AND RELATED ART

The present invention relates to an optical scanning apparatus for use with an image forming apparatus such as a copying machine, a printer, a facsimile machine or a multi-function machine having functions of these machines.

As the optical scanning apparatus used in the image forming apparatus of an electrophotographic type, an optical scanning apparatus having the following constitution is well known. That is, the optical scanning apparatus is constituted so that a latent image is formed by scanning a surface-to-be-scanned with a light spot formed by deflecting a light beam emitted from a light source and then by concentrating the light beam by a scanning imaging optical system. Inside the optical scanning apparatus, a rotatable polygonal mirror for deflecting laser light emitted from a semiconductor laser is provided, and by rotation of this rotatable polygonal mirror at a high speed, the laser light is deflected. Then, not only a photosensitive drum is scanned with the deflected laser light but also turning-on and turning-off of the semiconductor laser are repeated, so that a desired latent image is formed on the photosensitive drum.

In the image forming apparatus in recent years, a product in which a high-definite image of 1200 dpi or 2400 dpi is formed goes mainstream, and a product with a high productivity such that the number of output sheets per unit time is large has been required. As a technique meeting these requirements, a type in which the number of points of light emission of the light source is increased and a type in which a rotational speed of the rotatable polygonal mirror of a deflector is increased would be considered. In the former type, with an increase in the number of points of light emission, a device size becomes large, so that not only design latitude is largely impaired but also a cost remarkably increases. For that reason, in general, the type in which the rotational speed of the rotatable polygonal mirror is increased is employed in many cases, but there arises a problem also in this type.

With an increase in number of revolutions of the rotatable polygonal mirror, a quantity of heat generated from the defalcator becomes large, and the heat rides upon the winds generated by rotation of the rotatable polygonal mirror and thus results in hot amount, and then the hot air is diffused in a periphery of the deflector of the optical scanning apparatus. The hot air is diffused in the periphery while avoiding a shape of a casing of the optical scanning apparatus provided in the periphery of the deflector and members provided inside the optical scanning apparatus. For that reason, the hot air does not uniformly diffuse in a circumferential shape but diffuses as a biased flow. As a result, a biased temperature distribution generates inside the optical scanning apparatus, biased temperature rise of optical component parts such as a lens, biased temperature rise of the casing generates, so that respective members are deformed and thus a positional fluctuation or the like of the light beam (scanning line) occurs.

In these days, a product having a constitution in which not only a periphery of a deflector which is a heat source is covered with a cover member and thus hot air blowing into the periphery is controlled but also a toner change in the neighborhood thereof is measured and deformation of the casing or the like and a light beam fluctuation due to the deformation of the casing or the like are predicted and corrected has been proposed. For example, in Japanese Laid-Open Patent Application (JP-A) 2017-191258, a constitution in which a part of a cover member configured to cover the deflector is provided with a temperature sensor has been proposed. JP-A 2017-191258 discloses arrangement of the temperature sensor which is rotated on the cover member and which is a position deviated in a lateral direction from an opening of the cover member through which amount (wind) generating by a rotational operation of the rotatable polygonal mirror of the deflector enters and exits in a large amount.

However, the temperature sensor having the above constitution is disposed at a position which is deviated from air flow paths of both "air flow entering deflector" and "air flow existing from deflector" which generate by rotation of the rotatable polygonal mirror of the deflector. For that reason, at a place where the temperature sensor is provided, the air flow becomes unstable or stagnates in some instances, so that it becomes difficult that the temperature sensor measures an accurate temperature change of the casing of the optical scanning apparatus. The deformation of the casing due to the temperature distribution and the light beam fluctuation with the deformation of the casing are phenomena generated by conduction of heat of the deflector which is the heat source to a wall surface of the casing of the optical scanning apparatus and thus by causing a temperature change. Accordingly, in order to carry out accurate correction control on the basis of a result of prediction of direction and amount of an occurrence of the light beam fluctuation, there is a need that a situation of the hot air inducing the temperature change of the casing of the optical scanning apparatus is accurately read by the temperature sensor.

Here, a result that a progression of the light beam change due to the temperature change is checked by using a plurality of temperature sensors provided in the optical scanning apparatus will be described. Each of graphs shown in FIG. 7 shows a result of an experiment conducted by using the optical scanning apparatus for guiding the laser light onto a photosensitive drum for forming a plurality of color images by a single deflector. Parts (a) to (e) of FIG. 7 are the graphs each in which a light beam change or a temperature change when the optical scanning apparatus is continuously driven is plotted. Part (a) of FIG. 7 is the graph showing a change amount of an irradiation position of the laser light with which the photosensitive drum is irradiated by continuously driving the optical scanning apparatus, in which the abscissa represents a driving time (min.) of the optical scanning apparatus and the ordinate represents a change amount (μm) of a light beam position. On the other hand, parts (b) to (e) of FIG. 7 are the graphs each showing the temperature change in the place where the temperature sensor is provided. Parts (b) and (c) of FIG. 7 are the graphs each showing a change in detection temperature by the temperature sensor when the optical scanning apparatus is continuously driven in the case where the temperature sensor is provided on an amount path (hot air path) along which the hot air blows from the deflector. Part (d) of FIG. 7 is the graph showing a change in detection temperature by the temperature sensor when the optical scanning apparatus is continuously driven in the case where the temperature sensor is provided in the neighborhood a rotation shaft of a scanner motor for driving the rotatable polygonal mirror of the optical scanning apparatus and a driven IC for controlling the scanner motor. Part (e) of FIG. 7 is the graph showing a change in detection temperature by the temperature sensor when the optical scanning apparatus is continuously driven in the case where the temperature sensor is provided in a place when the hot air does not blow against the temperature sensor. In parts (b) to (e) of FIG. 7, the abscissa represents the driving time (min.) of the optical scanning apparatus, and the ordinate represents the temperature change (° C.).

As is understood from parts (a) to (c) of FIG. 7, the graphs shown in parts (a) to (c) of FIG. 7 are those similar to each other in a shape of the change. From parts (b) and (c) of FIG. 7, it is understood that when the optical scanning apparatus is continuously driven, with progression of the driving time, the temperature of the hot air detected by the temperature sensor also rise. From part (a) of FIG. 7, it is understood that when the optical scanning apparatus is continuously driven, with progression of the driving time, the change amount of the irradiation position of the laser light with which the photosensitive drum is irradiated becomes large. From this result, it is understood that the progression of the change of the laser light is high in correlation by the influence of the hot air from the deflector. On the other hand, in the graph shown in part (d) of FIG. 7, until a lapse of about 15 min. from the drive of the optical scanning apparatus, the temperature detected by the temperature sensor is lower than the temperature before the optical scanning apparatus is driven. Thereafter, the toner detected by the temperature sensor rises, but the shape of the graph showing the temperature change is somewhat different from the shapes of the graphs of parts (b) and (c) of FIG. 7. From the graph shown in part (d) of FIG. 7, it is understood that when the position where the temperature sensor is provided is excessively bright near to the rotation shaft of the scanner motor and the heat source of the driver IC, the graph shape is strongly influenced by heat generation from the heat source and thus the correlation with the laser light fluctuation is broken. Further, in part (e) of FIG. 7, the temperature sensor is provided in a place such that the hot air from the deflector does not blow against the temperature sensor, and therefore, even when the optical scanning apparatus is continuously driven, the temperature does not rise depending on a time, so that the temperature sensor cannot grasp the deformation of the casing due to the hot air. That is, it is understood that in the case where the temperature sensor is provided in the place which is away from the deflector and against which the hot air does not blow, it is difficult to obtain the correlation with the positional fluctuation of the laser light shown in part (a) of FIG. 7.

Inside the image forming apparatus, light beams for forming the respective color images cause different fluctuations, and therefore, in order to obtain a good image, for all the light beams for forming the color images, there is a need that accurate change in irradiation position is predicted and corrected. For example, apparent image formed is influenced by resolution and a degree of roughness of the image, but when a deviation between the color images is several tens of μm or more in actuality, a lowering in image quality such as a change in color (hue) or such that a thin line is seen doubly occurs. In the case of the constitution of the optical scanning apparatus as in the above-described conventional example, it is difficult to accurately detect that blowing of the hot air from the deflector against the casing of the optical scanning apparatus has the influence on the casing to what degree. For that reason, even when correction or the like of image color registration is intended to be made depending on a result of prediction of the light beam fluctuation made on the basis of the temperature change amount detected by the temperature sensor, there arises a problem such that the light beam deviation causing the lowering in image quality remains as a correction residual (error).

SUMMARY OF THE INVENTION

The present invention has been accomplished in the above-described circumstances, and a principal object of the present invention is to provide an optical scanning apparatus in which a temperature sensor is provided at a position where a temperature of an inside of the optical scanning apparatus can be detected with accuracy.

According to an aspect of the present invention, there is provided an optical scanning apparatus comprising: a light source configured to emit a light beam; a deflecting unit configured to deflect the light beam so that a photosensitive member is scanned with the light beam emitted from the light source; an optical member configured to guide the light beam, to the photosensitive member, deflected by the deflecting unit; a casing configured to accommodate the light source, the deflecting unit and the optical member; a cover member configured to cover a periphery of the deflecting unit; and a detecting unit configured to detect a temperature of an inside of the casing, wherein the cover member is provided with a first opening permitting passage of the light beam emitted from the light source and entrance of the light beam into the deflecting unit, a second opening permitting passage of the light beam deflected by the deflecting unit, and a third opening and a fourth opening which are provided in positions on a side opposite from the first opening and the second opening with respect to the deflecting unit, wherein through the third opening, an outflow of the air from the cover member by rotation of the deflecting unit is relatively high, wherein through the fourth opening, an inflow of the air into the cover member by rotation of the deflecting unit is relatively high, and wherein the detecting unit is provided at a position where the air flow blowing through the third opening hits the detecting unit.

Further features of the present invention will become apparent from the following description of exemplary embodiments with reference to the attached drawings.

Figure 4:
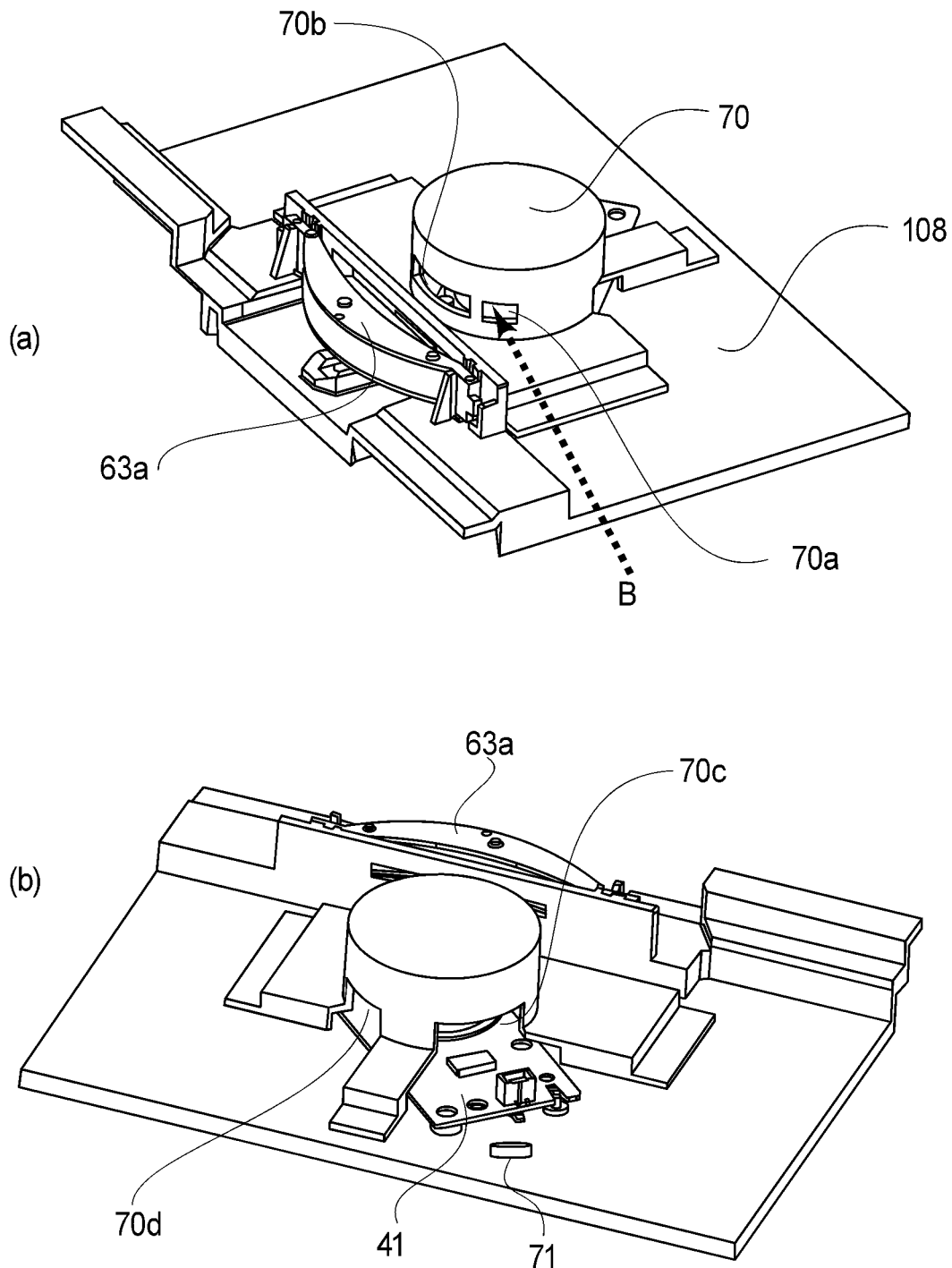

Parts (a) and (b) of FIG. 4 are schematic perspective views each showing a periphery of the deflector in the embodiments 1 and 2.

Figure 5:
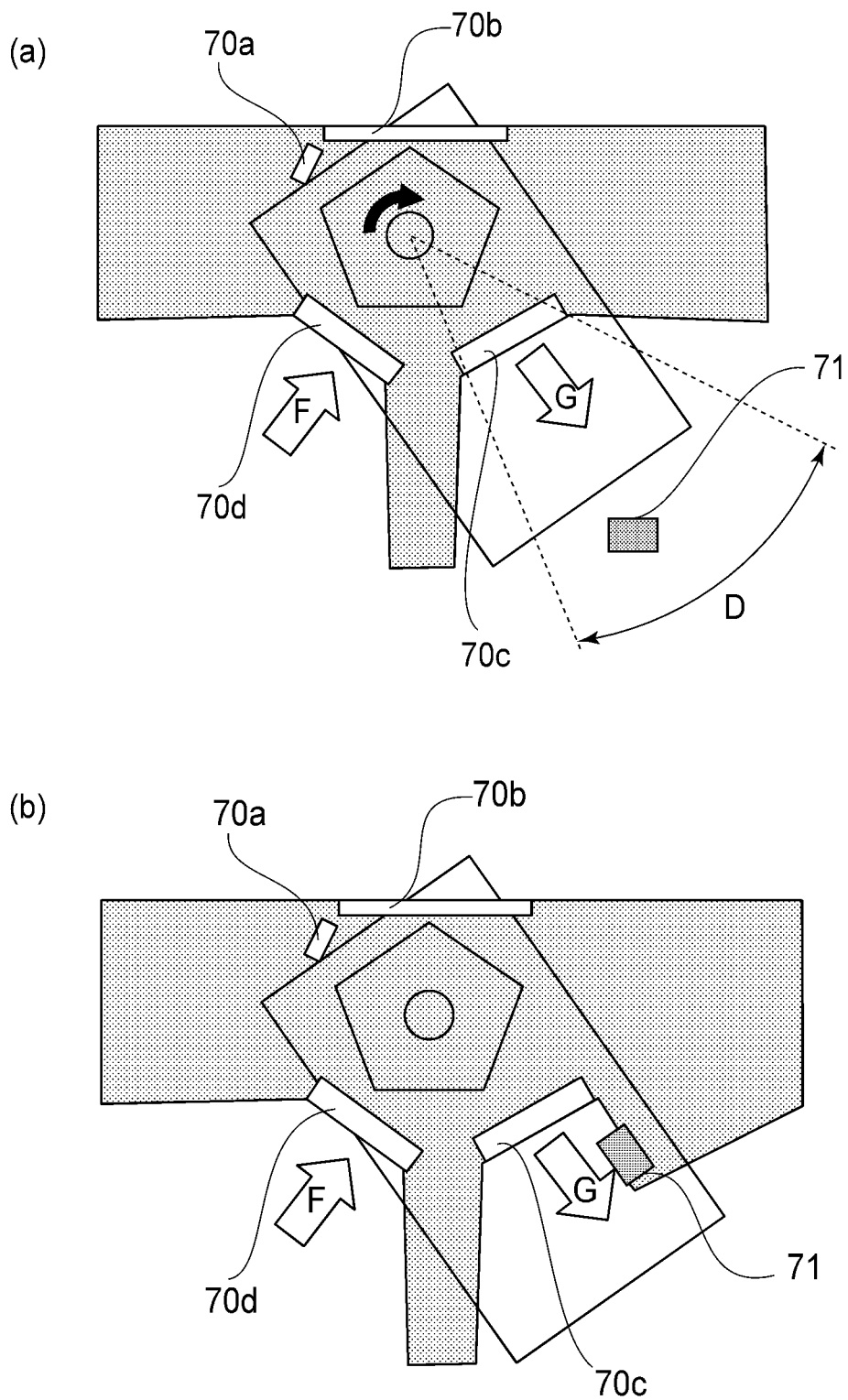

Parts (a) and (b) of FIG. 5 are schematic views each illustrating a locating position of a temperature sensor in the embodiment 1.

Figure 6:
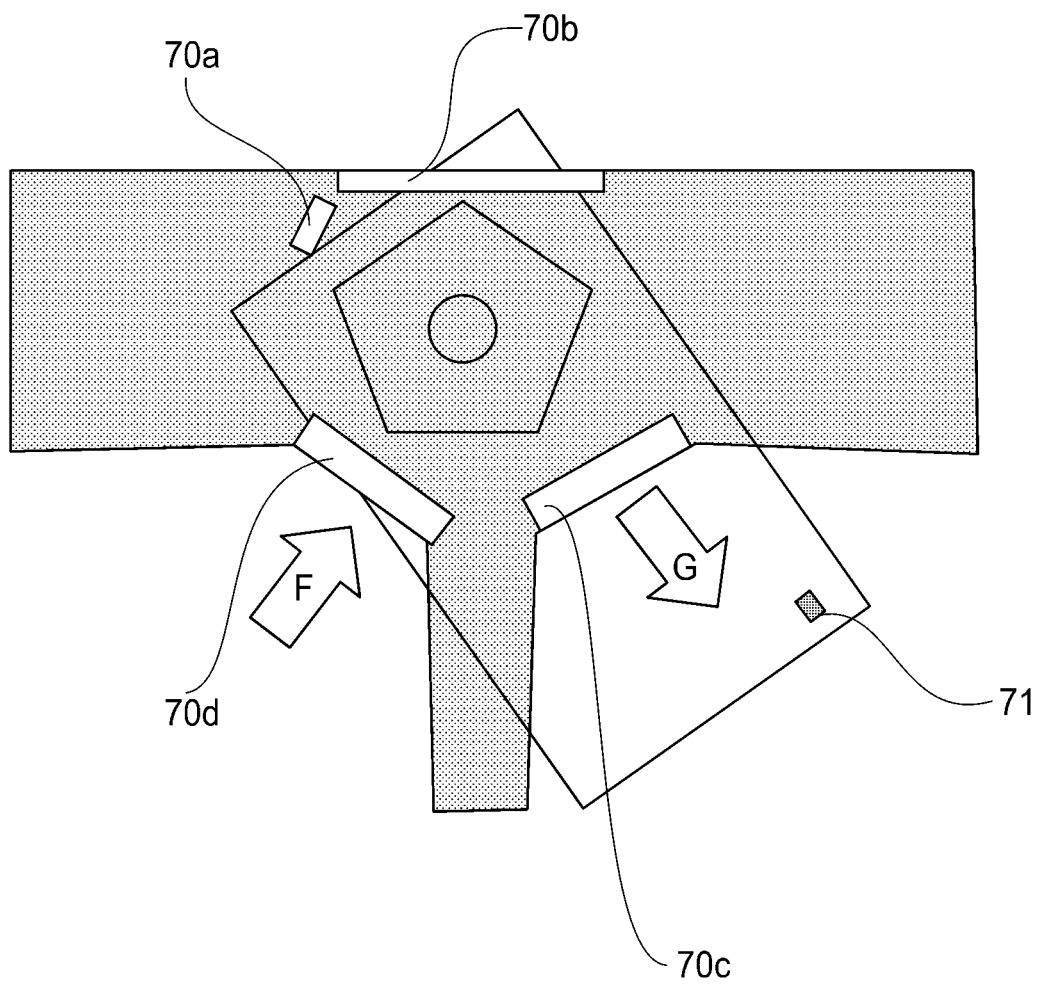

FIG. 6 is a schematic view illustrating a locating position of a temperature sensor in the embodiment 2.

Figure 7:
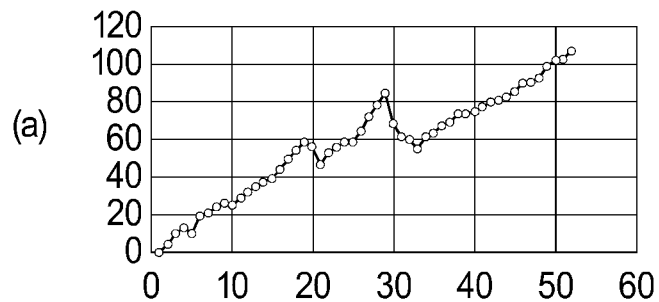
Figure 7:
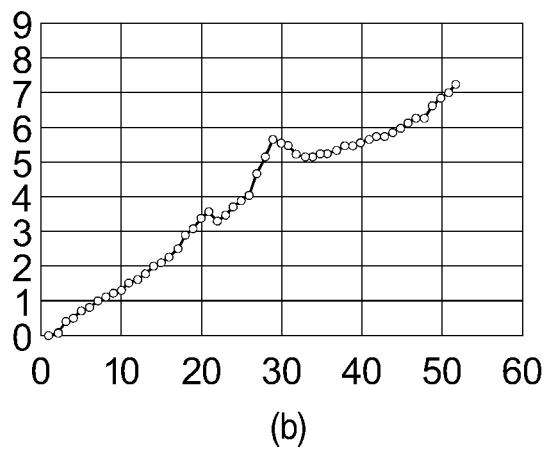
Figure 7:
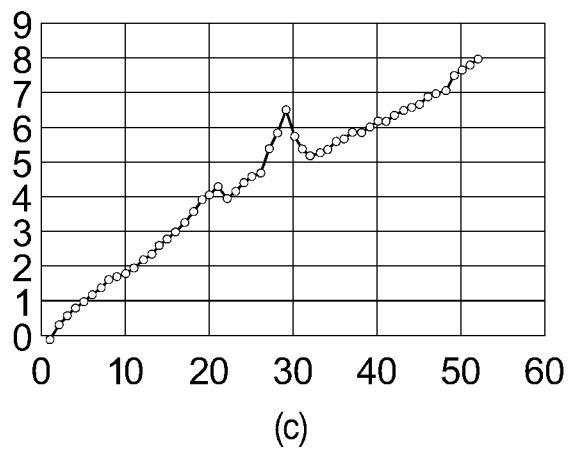
Figure 7:
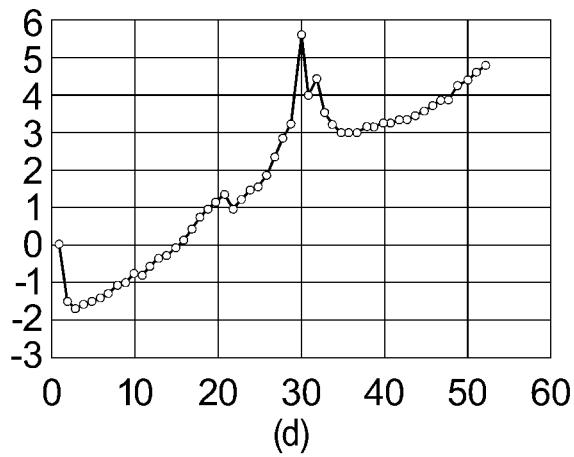
Figure 7:
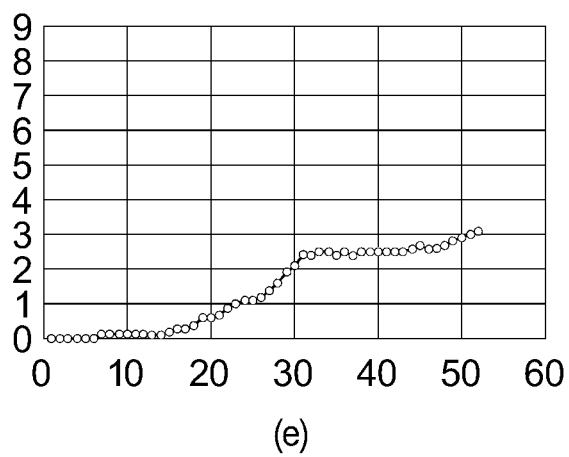

Parts (a) to (e) of FIG. 7 are graphs each illustrating a relationship between a driving time and a light beam position fluctuation amount or a detection temperature change.

DESCRIPTION OF EMBODIMENTS

Embodiments of the present invention will be specifically described with reference to the drawings.

Embodiment 1

In the following description, a rotational axis direction of a rotatable polygonal mirror of a deflector 41 described later is Z-axis direction, a main scan direction as a scanning direction of a light beam or a longitudinal direction of an optical member is Y-axis direction, and a direction perpendicular to the Y-axis direction and the Z-axis direction is X-axis direction. Incidentally, an optical axis direction of the optical member is a direction substantially parallel to the X-axis direction. Further, the Z-axis direction is also a sub-scan direction which is a rotational direction of a photosensitive drum described later.

[Structure of Image Forming Apparatus]

Figure 1:
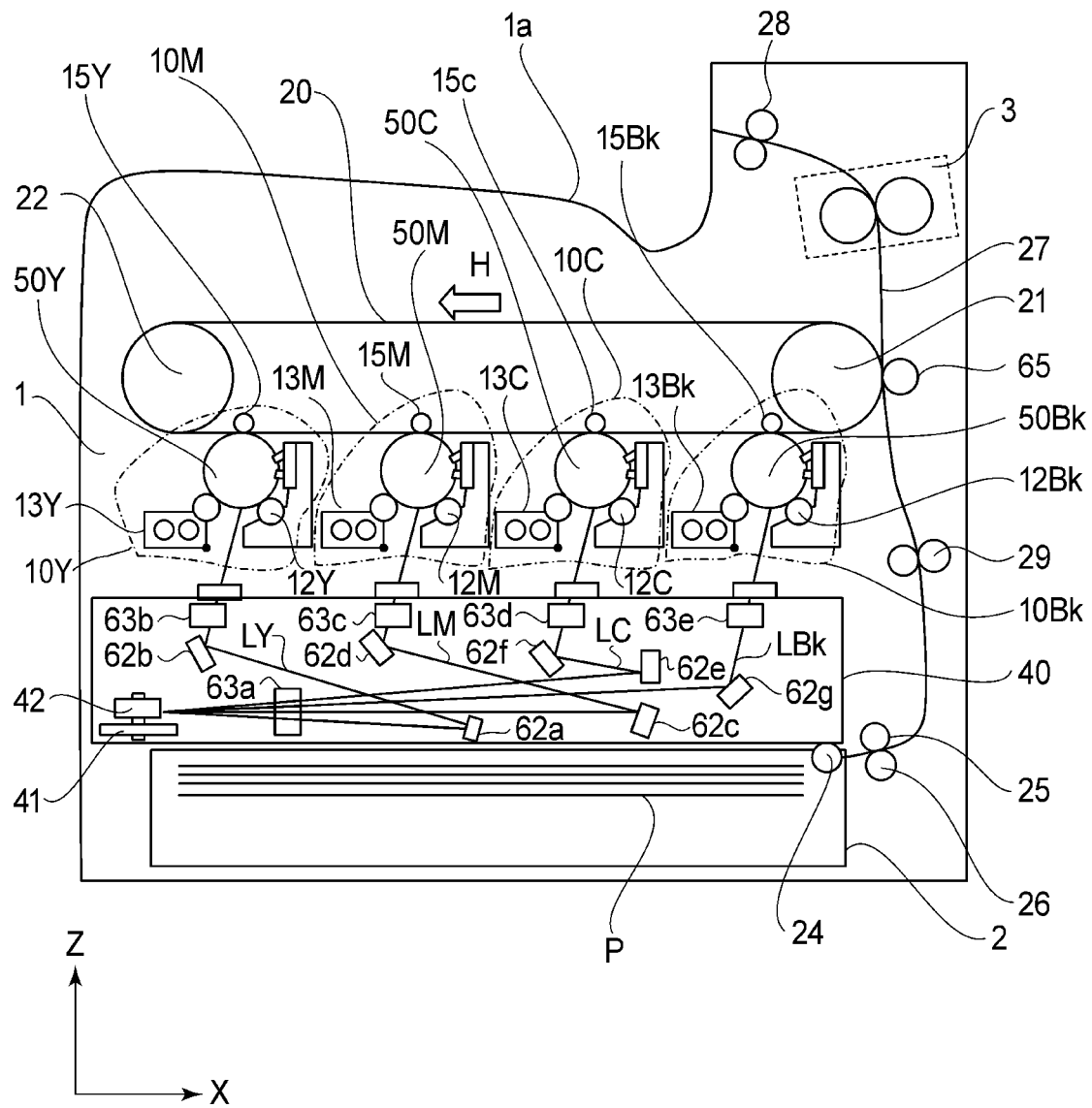
FIG. 1 is a schematic sectional view showing a structure of an image forming apparatus in embodiments 1 and 2.

A structure (constitution) of an image forming apparatus in an embodiment 1 will be described. FIG. 1 is a schematic view showing a general structure of a color laser beam printer 1 of a tandem type (hereinafter simply referred to as a printer 1) in this embodiment. The printer 1 includes four image forming engines 10Y, 10M, 10C and 10Bk (indicated by chain lines) for forming toner images of colors of yellow (Y), magenta (M), cyan (C) and black (Bk), respectively. The printer further includes an intermediary transfer belt 20 onto which the toner images are transferred from the engines 10Y, 10M, 10C and 10Bk. A constitution in which the toner images transferred superposedly onto the intermediary transfer belt 20 are transferred onto a recording sheet P as a recording material and a full-color image is formed is employed. In the following, symbols Y, M, C and Bk for representing the associated colors will be omitted except for necessary cases.

The intermediary transfer belt 20 is formed in an endless shape and is extended around a pair of belt feeding rollers 21 and 22, and is constituted so that the toner images formed by the respective image forming engines 10 are transferred onto the intermediary transfer belt 20 while being operated and rotated in an arrow H direction. Further, at a position opposing the belt feeding roller 21 through the intermediary transfer belt 20, a secondary transfer roller 65 is provided.

The recording sheet P is inserted between the secondary transfer roller 65 and the intermediary transfer belt 20 which are press contacted to each other, so that the toner images are transferred from the intermediary transfer belt 20 onto the recording sheet P. In a lower side of the intermediary transfer belt 20, the above described four image forming engines 10Y, 10M, 10C and 10Bk are disposed in parallel to each other, so that the toner images formed depending on respective pieces of color image information. These four image forming engines 10 are disposed along a rotational direction (arrow H direction) of the intermediary transfer belt 20 in the order of the image forming engines 10Y for yellow, 10M for magenta, 10C for cyan and 10Bk for black.

Below the image forming engines 10, an optical scanning apparatus 40 for exposing, to light depending on the associated image information, each of photosensitive drums 50 which are photosensitive members provided in the respective image forming engines 10 is provided. Detailed description of the optical scanning apparatus 40 will be described later. The optical scanning apparatus 40 is common to all of the image forming engines and includes four semiconductor lasers (not shown) which emit laser beams (light beams) modulated depending on the respective pieces of color image information and which are unshown light sources. The optical scanning apparatus 40 includes a deflector 41 consisting of a rotatable polygonal mirror 42 which rotates at high speed and which scans the photosensitive drums 50 in four optical paths with the light beams along rotational axis directions (Y-axis direction) of the photosensitive drums 50 and a motor unit for rotating the rotatable polygonal mirror 41. The respective light beams with which the photosensitive drums 50 are scanned by the deflector 41 and advance along predetermined paths while being guided by optical members provided in the optical scanning apparatus 40. Then, the respective photosensitive drums 50 of the image forming engines 10 are exposed to the light beams through irradiation openings (not shown) provided at an upper portion of the optical scanning apparatus 40.

Further, each of the respective image forming engines 10 includes the photosensitive drum 50 and a charging roller 12 for electrically charging the photosensitive drum 50 to a uniform background portion potential. Each of the image forming engines 10 includes a developing device 13 for forming the toner image by developing, with the toner, an electrostatic latent image formed on the photosensitive drum 50 (photosensitive members) by the exposure to the light beam. The developing device 13 forms the toner image depending on the associated color image information on the photosensitive drum 50 which is the photosensitive member.

At a position opposing the photosensitive drum 50 of the associated one of the image forming engines 10, a primary transfer roller 15 is provided so as to sandwich the intermediary transfer belt 20 between itself and the photosensitive drum 50. A predetermined transfer voltage is applied to the primary transfer roller 15, so that the toner image is transferred from the photosensitive drum 50 onto the intermediary transfer belt 20.

On the other hand, the recording sheet P is supplied from a sheet feeding cassette 2 accommodated at a lower portion of the printer 1 to an inside of the printer, specifically a secondary transfer position where the intermediary transfer belt 20 and the secondary transfer roller 65 are in contact with each other. At an upper portion of the sheet feeding cassette 2, a pick-up roller 24 and a sheet feeding roller 25 are provided adjacently to each other. Further, at a position opposing the sheet feeding roller 25, a retard roller 26 for preventing double feeding of the recording sheets P is provided. A feeding path 27 of the recording sheet P in the printer is provided substantially vertically along a side surface of the printer 1. The recording sheet P pulled-out from the sheet feeding cassette 2 positioned at the bottom of the printer 1 moves upward in the feeding path 27 and is sent to a registration roller pair 29 for controlling an entering timing of the recording sheet P into the secondary transfer position. Thereafter, the recording sheet P is, after the toner image is transferred at the secondary transfer position, sent to a fixing device 3 (indicated by a broken line in FIG. 1) provided in a downstream side of a recording sheet feeding direction. Then, the recording sheet P on which the toner image is fixed by the fixing device 3 passes through a discharging roller 28 and is discharged onto a discharge tray 1a provided at an upper surface of the printer 1.

[Structure of Optical Scanning Apparatus]

Figure 2:
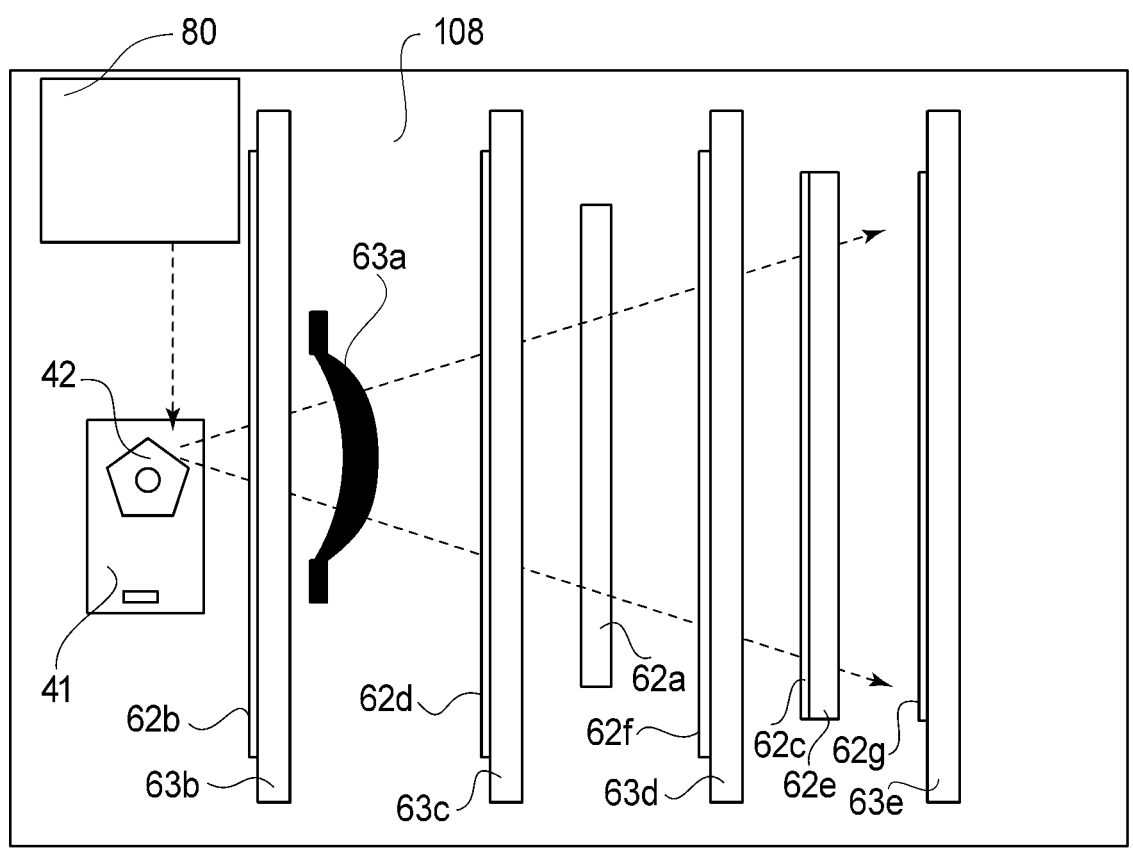
FIG. 2 is a top plan view showing a structure of an optical scanning apparatus in the embodiments 1 and 2.

FIG. 2 is a top plan view of a casing (also referred to as an optical box) 108 of the optical scanning apparatus 40 when the optical scanning apparatus 40 is seen from above in FIG. 1, and is the view for illustrating a locating position of reflection mirrors 62 (62a to 62g) and optical lenses 63 (63a to 63e) which are optical members. FIG. 2 shows a state of the optical scanning apparatus 40 in which an upper cover of the casing 108 is removed. Inside the optical scanning apparatus 40, a light source unit 80 (not shown in FIG. 1) in which a light source for emitting a light beam (laser light) is mounted, the rotatable polygonal mirror 42 for deflecting the light beam, and the deflector 41 on which the rotatable polygonal mirror 42 is mounted are provided. The optical scanning apparatus 40 further includes the optical lenses 63a to 63e and the reflection mirrors 62a to 62g for guiding respective light beams onto the photosensitive drums 50 and then for forming images on the photosensitive drums 50. Incidentally, the optical scanning apparatus 40 of this embodiment is not of a type in which the deflector 41 is provided at a central portion of the casing 108 of the optical scanning apparatus, but is of a type in which the deflector 41 is provided on one side (left side in FIG. 2).

FIG. 1 is the schematic sectional view showing an entirety of the optical scanning apparatus 40 in which the optical component parts shown in FIG. 2 are mounted. A light beam LY which is emitted from the light source unit 80 (not shown in FIG. 1) and which corresponds to the photosensitive drum 50Y is deflected by the rotatable polygonal mirror 42 and enters an optical lens 63a. The light beam LY passed through the optical lens 63a is reflected by the reflection mirror 62a and then is reflected by the reflection mirror 62b and passes through the optical lens 63b, and thereafter passes through a transparent window (not shown), so that the photosensitive drum 50Y is scanned with the light beam LY.

A light beam LM which is emitted from the light source unit 80 (not shown in FIG. 1) and which corresponds to the photosensitive drum 50M is deflected by the rotatable polygonal mirror 42 and enters an optical lens 63a. The light beam LM passed through the optical lens 63a is reflected by the reflection mirror 62c and then is reflected by the reflection mirror 62d and passes through the optical lens 63b, and thereafter passes through a transparent window (not shown), so that the photosensitive drum 50M is scanned with the light beam LM.

A light beam LC which is emitted from the light source unit 80 (not shown in FIG. 1) and which corresponds to the photosensitive drum 50C is deflected by the rotatable polygonal mirror 42 and enters an optical lens 63a. The light beam LC passed through the optical lens 63a is reflected by the reflection mirror 62e and then is reflected by the reflection mirror 62f and passes through the optical lens 63d, and thereafter passes through a transparent window (not shown), so that the photosensitive drum 50C is scanned with the light beam LC.

A light beam LBk which is emitted from the light source unit 80 (not shown in FIG. 1) and which corresponds to the photosensitive drum 50Bk is deflected by the rotatable polygonal mirror 42 and enters an optical lens 63a. The light beam LBk passed through the optical lens 63a is reflected by the reflection mirror 62g. The light beam LBk reflected by the reflecting mirror 62g passes through the optical lens 63e and then passes through a transparent window (not shown), so that the photosensitive drum 50Bk is scanned with the light beam LBk.

[Structure of Deflector]

Figure 3:
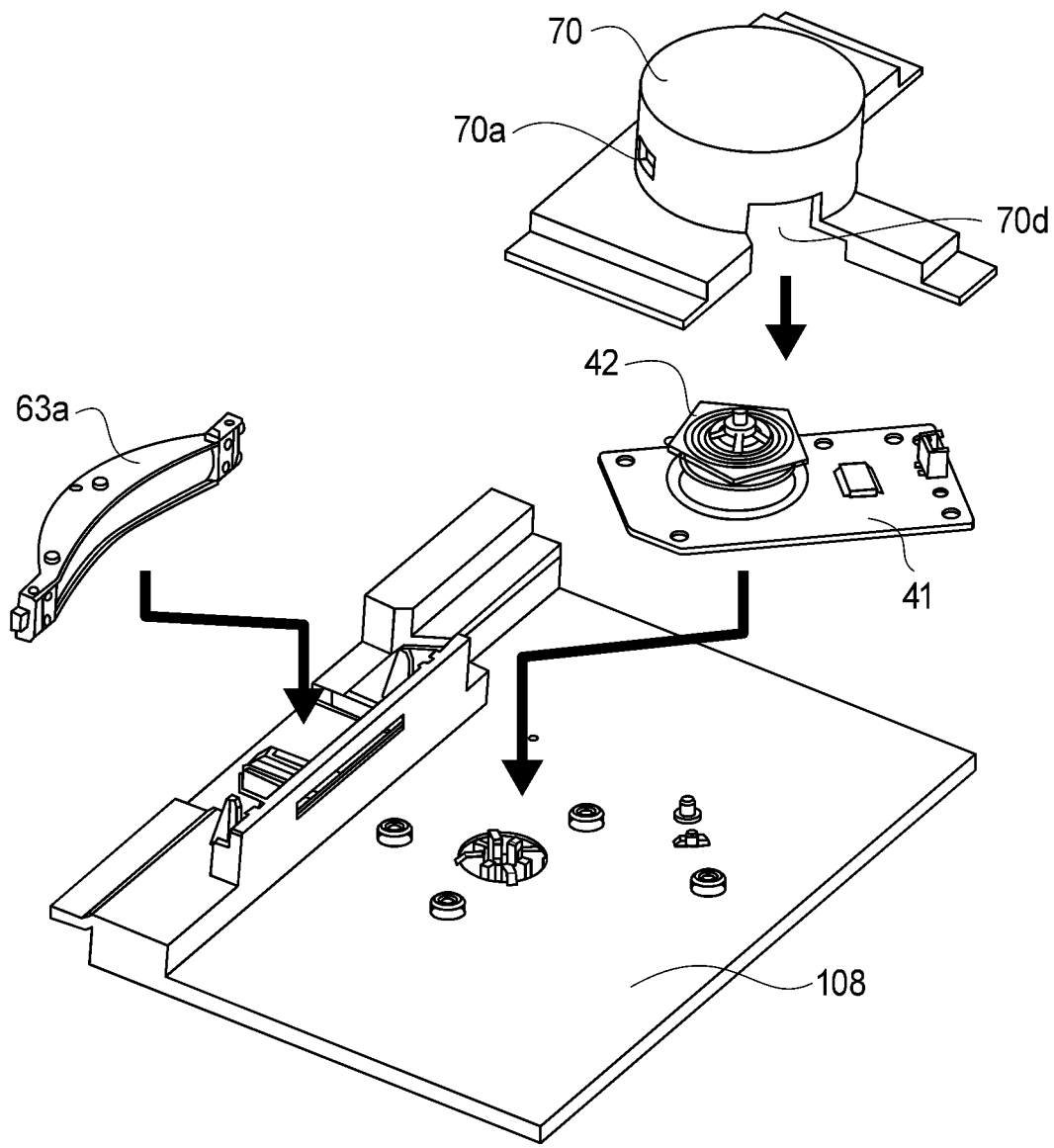
FIG. 3 is a schematic view for illustrating assembling a deflector in the embodiments 1 and 2.

FIG. 3 is a perspective view for illustrating a state in which an optical lens (imaging lens) 63a, the deflector 41 and a cover member 70 for the deflector 41 are assembled to the casing 108. The imaging lens 63a and the deflector 41 are mounted on the casing 108 along arrows in the figure. Thereafter, the cover member 70 is provided at an upper portion of the deflector 41. Parts (a) and (b) of FIG. 4 are schematic perspective views each showing a portion in the neighborhood of the deflector 41 of the optical scanning apparatus of this embodiment. Parts (a) and (b) of FIG. 5 are schematic views each showing the deflector 41 as seen from above with respect to a rotational axis direction of a scanner motor for the deflector 41. Inside the optical scanning apparatus 40, the deflector 41 for deflecting the laser light emitted from the light source unit 80 (not shown in FIGS. 4 and 5) is provided. Further, inside the casing 108, a plurality of optical component parts (not shown), such as the optical lenses and the reflection mirrors, including the imaging lens 63a for guiding and focusing the laser light, deflected by the deflector 41, onto a surface-to-be-scanned of the photosensitive drum 50 are provided (see FIG. 2).

[Structure of Cover Member]

As shown in FIG. 4, the cover member 70 for the deflector 41 is configured to cover the deflector 41 and a periphery of the deflector 41. The cover member 70 is fixed on the casing 108 of the optical scanning apparatus 40 by a fixing member such as screws (not shown) and has a shape such that a plurality of openings through which blowing and suction of an air flow generated by rotation of the scanner motor for the deflector 41 are carried out. As shown in FIGS. 4 and 5, four openings are provided by fixing the cover member 70 to the casing 108. An opening 70a which is a first opening provided at a part of the cover member 70 for the deflector 41 is disposed in a path along which laser light B (indicated by an arrow in FIG. 4) emitted from the light source unit 80 is incident on a reflection surface of the rotatable polygonal mirror 42. Further, an opening 70b which is a second opening provided in a path along which the laser light deflected by the rotatable polygonal mirror is guided to the imaging lens 63a which is a first optical lens adjacent to the deflector 41. Here, in general, an interval between an incident light beam onto the deflector 41 (rotatable polygonal mirror 42) and a scanning light beam deflected by the deflector 41 (rotatable polygonal mirror 42) is designed so as to be very short in many instances. For that reason, there is no harm in designing the openings 70a and 70b as a single continuous opening.

An opening 70c which is a third opening and an opening 70d which is a fourth opening are provided at portions which are away from the openings 70a and 70b with respect to the imaging lens 63a. Further, the openings 70c and 70d are configured to permit passage of most of the air flow (hot air) going into and coming out of the cover member 70 when the rotatable polygonal mirror 42 is rotated. This is because most of the hot air passes through the openings 70c and 70d, whereby generation of thermal deformation and generation of a lowering in image quality due to direct blowing of the hot air against the optical component parts provided inside the optical scanning apparatus 40 is prevented. Incidentally, the opening 70c is provided on a side upstream of the opening 70d with respect to the rotation direction (clockwise direction) of the rotatable polygonal mirror 42 (see part (a) of FIG. 5).

In the optical scanning apparatus of this embodiment, between the opening 70a through which the laser light B which will be incident on the deflector 41 passes and the opening 71b through which the laser light B deflected by the deflector 41 exits, a sensor for detecting the laser light and for outputting a detection signal for synchronism with rotation control is provided. The laser light B is constituted so as to be thereafter guided in a direction toward the opening 70b. For that reason, the deflector 41 is rotated in an arrow direction (clockwise direction) in part (a) of FIG. 5.

In the case where a rotatable member such as the rotatable polygonal mirror is rotated in an open space uncovered at a periphery thereof, with rotation of the rotatable member, air (air flow) blows (circumferentially) along a circumference of the rotatable member. On the other hand, as shown in FIG. 5, in the case where a wall surface is provided by covering the rotatable member so as to close a periphery of the rotatable member, most of the air (air flow) blows from a portion where there is no restriction of the wall surface of the cover member. Accordingly, the constitution of the deflector 41 of the optical scanning apparatus 40 of this embodiment is as described above, and therefore, with rotation of the rotatable polygonal mirror 42, most of the air (indicated by an arrow G of FIG. 5) blows out through the opening 70c of the openings provided in the cover member 70. Further, while the air (air flow) blows out through the opening 70c, most of the air (air flow) (indicated by an arrow F of FIG. 5) is taken into the cover member 70 through the opening 70d adjacent to the opening 70c.

Incidentally, attention should be given to that the flow of air (air flow) changes complicatedly by a shape of a peripheral member. For that reason, air (air flow) moving toward a center of the rotatable polygonal mirror 42 through the opening 70c exists not a little, and amount (air flow) moving away from the center of the rotatable polygonal mirror 42 through the 70d exists not a little. In the case where a difference in amount between the air (air flow) blowing from the center of the rotatable polygonal mirror 42 toward the periphery of the rotatable polygonal mirror 42 and the air (air flow) blowing toward the center of the rotatable polygonal mirror 42 is taken into consideration, the following relationship is satisfied. That is, a proportion of the air (air flow) blowing out of the inside of the cover member 70 through the opening 70c is higher than a proportion of the air (air flow) blowing into the cover member 70 through the opening 70c. On the other hand, the proportion of the air (air flow) blowing into the cover member 70 through the opening 70d is higher than the proportion of the air (air flow) blowing out of the inside of the cover member 70 through the opening 70d. Thus, through the opening 70c, the air (air flow 9 in a larger amount blows from the inside of the cover member 70, and through the opening 70d, the air (air flow) in a larger amount blows into the cover member 70.

Although, the air (air flow) goes out and comes in through the openings 70a and 70b, but the openings 70a and 70b are configured to be formed as minimum openings through which only the laser light used for image formation is not blocked so as not to cause biased deformation by blowing of the hot air from the deflector 41 against the imaging lens 63a. As a result, compared with the openings 70c and 70d, the openings 70a and 70b are configured so that the amount of the air (air flow) blowing out of and into the cover member 70 is small.

[Locating Position of Temperature Sensor]

A temperature sensor 71 which is a temperature detecting unit is provided on the casing 108, and a position thereof falls within a range (indicated by an arrow D of part (a) of FIG. 5) sandwiched by a rectilinear line connecting one opposite end of the opening 70c and a rotation shaft center which is a rotation center of the rotatable polygonal mirror 42 of the deflector 41 and a rectilinear line connecting the other opposite end of the opening 70c and the rotation shaft center of the rotatable polygonal mirror 42. The locating position of the temperature sensor 71 is limited to the range described above, so that the temperature sensor 71 can be disposed downstream of the hot air blowing out through the opening 70c. By employing such a constitution, the temperature sensor 71 is capable of accurately detecting that a heat quantity is supplied to the casing 108 to what degree by the hot air (air flow) blowing out through the opening 70c.

As described above, deformation of the casing 108 and a positional fluctuation of the laser light, caused with the deformation, emitted to the surface of the photosensitive drum 50 are phenomena in which the heat of the deflector 41 which is the heat source is influenced by being given to the casing 108 to what degree and by generation of a biased temperature distribution to what degree. For that reason, the positional fluctuation of the laser light can be accurately predicted by accurately detecting the temperature change of the hot air blowing against the casing 108, by the temperature sensor 71. As a result, positional adjustment accuracy of each of the color images can be improved, so that a good product image with no color misregistration can be obtained.

The locating position of the above-described temperature sensor 71 is on the casing 108 as shown in part (a) of FIG. 5, but for example, the temperature sensor 71 may also be provided to the cover member 70. The temperature sensor 71 shown in part (b) of FIG. 5 is fixed t an extended portion of the cover member 70 and is provided so as to fall within the range (indicated by the arrow D of part (a) of FIG. 5) in which the hot air G from the deflector 41 passes through the opening 70c. Even in the case where the temperature sensor 71 is disposed in such a manner, a prediction effect similar to that in the case of part (a) of FIG. 5 is obtained, and in addition, the temperature sensor 71 can be disposed at an upper portion of a substrate of the deflector 41, so that effects of space saving and improvement in design latitude can be achieved.

As described above, according to this embodiment, the temperature sensor can be provided in the position where the temperature of the inside of the optical scanning apparatus can be detected with accuracy.

Embodiment 2

In the embodiment 1, an example in which the temperature sensor was provided on the casing of the optical scanning apparatus or to the cover member covering the deflector was described. In this embodiment an example in which the temperature sensor is provided on the substrate will be described.

[Locating Position of Temperature Sensor]

FIG. 6 is a schematic view for illustrating a locating position of the temperature sensor 71 in this embodiment. In this embodiment, the temperature sensor 71 is provided on the substrate of the deflector 41. The temperature sensor 71 is disposed so as not to be excessively influenced by the heat of a bearing portion of the scanner motor when the deflector 41 is rotated, and therefore, the temperature sensor 71 is disposed at an end portion of the substrate on a side opposite from the rotation shaft of the rotatable polygonal mirror 42 rotationally driven by the scanner motor. Further, the temperature sensor 71 is disposed in a position which is not downstream, with respect to a blowing-out direction of the hot air, of a connector for energization provided on the substrate of the deflector 41. Further, in order to accurately detect the temperature change due to the hot air from the deflector 41 by the temperature sensor 71, the substrate end portion where the temperature sensor 71 is disposed falls within the above-described range sandwiched between a rectilinear line connecting one opposite end of the opening 70c and the rotation shaft center of the rotatable polygonal mirror 42 of the deflector 41 and a rectilinear line connecting the other opposite end of the opening 70c and the rotation shaft center of the rotatable polygonal mirror 42.

By disposing the temperature sensor 71 in such a manner, an energization line and a signal line from the connector for electric power supply to the temperature sensor 71 can be combined with a bundle wire, so that an operation property during the assembling of the optical scanning apparatus can be improved. Further, in order to dispose the temperature sensor 71, a dedicated small substrate is not required to be prepared, so that not only cost reduction but also space saving can be achieved, and it becomes possible to realize commonalty of the ground (GND) line inclined in the bundle wire for the deflector 41.

As described above, according to this embodiment, the temperature sensor can be provided in the position where the temperature of the inside of the optical scanning apparatus can be detected with accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-034246 filed on Feb. 27, 2019, which is hereby incorporated by reference herein in its entirety.

What is claimed is:

1. An optical scanning apparatus comprising:
   a light source configured to emit a light beam;
   a deflecting unit configured to deflect the light beam so that a photosensitive member is scanned with the light beam emitted from said light source;
   an optical member configured to guide the light beam, to the photosensitive member, deflected by said deflecting unit;
   a casing configured to accommodate said light source, said deflecting unit and said optical member;
   a cover member configured to cover a periphery of said deflecting unit; and
   a detecting unit configured to detect a temperature of an inside of said casing,
   wherein said cover member is provided with a first opening permitting passage of the light beam emitted from said light source and entrance of the light beam into said deflecting unit, a second opening permitting passage of the light beam deflected by said deflecting unit, and a third opening and a fourth opening which are provided in positions on a side opposite from said first opening and said second opening with respect to said deflecting unit,
   wherein through said third opening, an outflow of the air from the cover member by rotation of said deflecting unit is relatively high,
   wherein through said fourth opening, an inflow of the air into the cover member by rotation of said deflecting unit is relatively high, and
   wherein said detecting unit is provided at a position where an air flow blowing through said third opening hits said detecting unit.

2. An optical scanning apparatus according to claim 1, wherein said detecting unit is provided in said casing.

3. An optical scanning apparatus according to claim 1, further comprising a substrate on which said deflecting unit is mounted,
   wherein said detecting unit is provided on said substrate.

4. An optical scanning apparatus according to claim 1, wherein said deflecting unit includes a motor and a rotatable polygonal mirror which is rotationally driven by said motor and which deflects the light beam by reflecting the light beam off a reflecting surface,
   wherein said detecting unit is provided at a position, where the air blowing out through said third opening, within a range sandwiched by a rectilinear line connecting a rotation center of said rotatable polygonal mirror and one of opposite ends of said third opening and a rectilinear line connecting the rotation center of said rotatable polygonal mirror and the other of the opposite ends of said third opening.

5. An optical scanning apparatus according to claim 4, wherein said third opening is provided on a side upstream of said fourth opening with respect to a rotational direction of said rotatable polygonal mirror.

6. An optical scanning apparatus according to claim 1, wherein said detecting unit is provided in said cover member.

* * * * *